U. S. SNYDER.
AUTOMOBILE.
APPLICATION FILED OCT. 8, 1908.
931,893.
Patented Aug. 24, 1909.
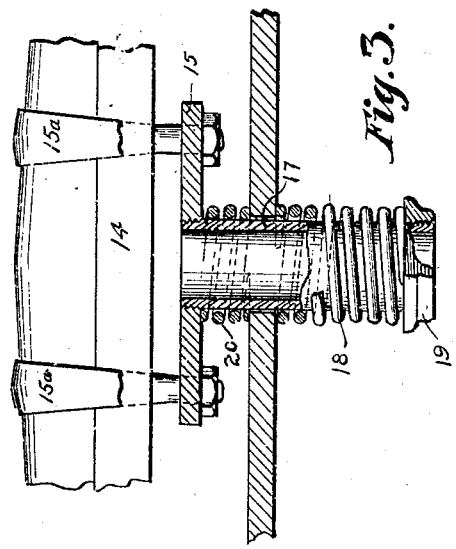
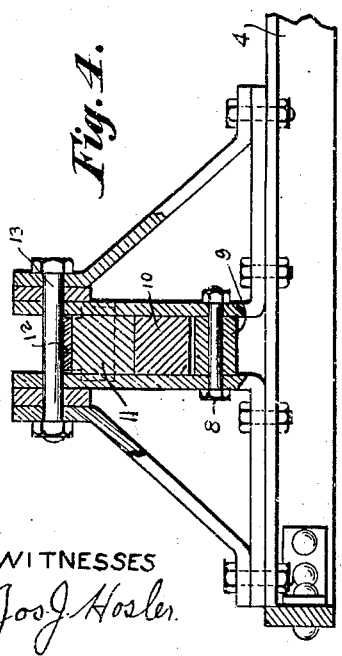
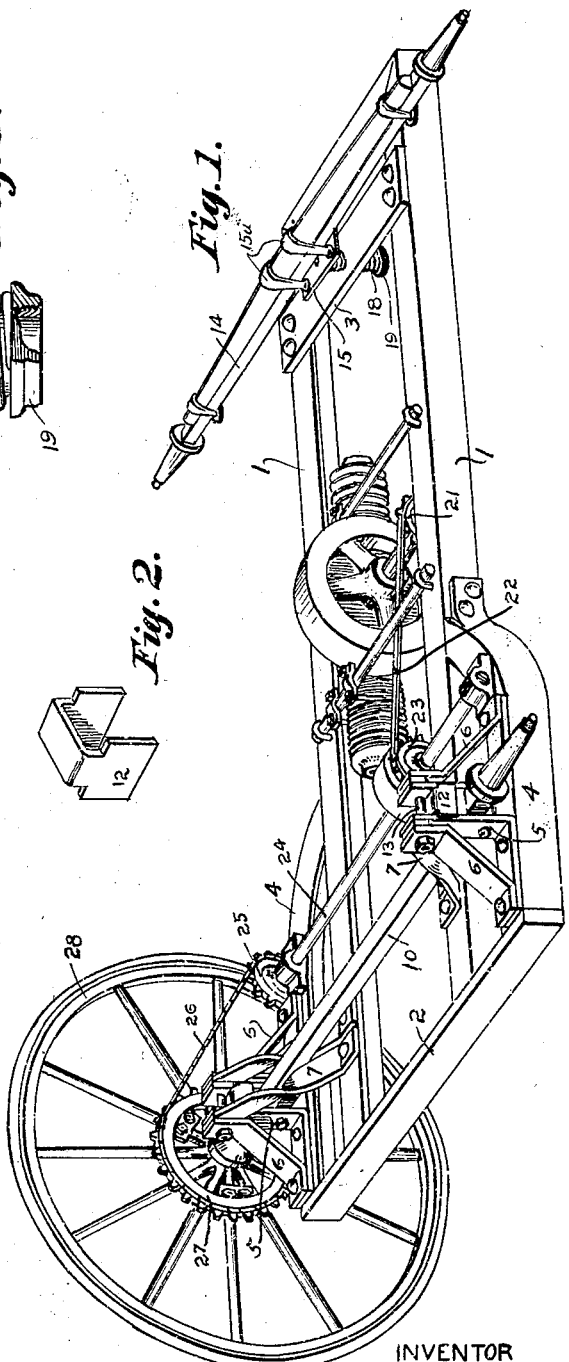
WITNESSES
Jos. J. Hosler.
Sylvia Boron.
INVENTOR
Ulides S. Snyder
BY
Bond & Miller
ATTORNEYS

UNITED STATES PATENT OFFICE.

ULIDES S. SNYDER, OF CANTON, OHIO.

AUTOMOBILE.

931,893.  Specification of Letters Patent.  Patented Aug. 24, 1909.

Application filed October 8, 1908. Serial No. 456,700.

*To all whom it may concern:*

Be it known that I, ULIDES S. SNYDER, a citizen of the United States, residing at Canton, in the county of Stark and State of Ohio, have invented certain new and useful Improvements in Automobiles; and I do hereby declare that the following is a full, clear, and exact description of the same.

The object of the present invention is to provide means whereby the running gear of an automobile may be suspended from the axles of an ordinary vehicle whereby the weight is located at a low point.

A further object is to so locate the running gear that the propelling mechanism may be located at a point where it will be out of the way of the body of the vehicle when the running gear and propelling mechanism are properly suspended from the axles. The precise construction of the running gear and the propelling mechanism has no specific reference to the present invention.

In the accompanying drawings Figure 1 is a perspective view showing the axle of a vehicle properly connected and illustrating a motor connected to the running gear or frame. Fig. 2 is a detached view of one of the cushion clips. Fig. 3 is a vertical section of the front or forward axle connection. Fig. 4 is a transverse section of the rear axle, showing the axle properly clipped and connected to the running gear.

Similar numerals of reference indicate corresponding parts in all the figures of the drawing.

In the accompanying drawing, 1 represents the side bars which are formed of angle iron and are held in proper spaced relationship with reference to each other by means of the cross bars 2 and 3, which parts together with the lateral bars or members 4 constitute the running gear or frame proper. To the rear end of this frame proper are attached in any convenient and well known manner the uprights 5, said uprights being attached to the lateral members 4. For the purpose of bracing these uprights 5 and holding them in proper spaced relationship with reference to each other the braces 6 are provided, which braces are attached at their opposite ends to the uprights 5 and to the lateral members 4. For the purpose of bracing the uprights laterally the braces 7 are provided. For the purpose hereinafter described the uprights 5 are provided near their bottom or lower ends with the cross bolts 8 upon which cross bolts 8 are located the cushioned blocks 9. The rear vehicle axle 10 is located between the pairs of uprights 6 as best illustrated in Figs. 1 and 4 and above the rear axle are located the cushioned blocks 11 which cushioned blocks rest and bear upon the rear axle 10.

For the purpose of preventing any accidental displacement of the rubber or cushioned blocks 11 the metal clips 12 are provided which metal clips are set over the rubber or cushioned blocks 11 as best illustrated in Fig. 1. Above the clips 12 are located the clamping bolts 13, which clamping bolts are so located that they will properly hold the rubber blocks or cushions 11 in contact with the axle 10. It will be understood that the running gear or frame proper will be suspended from the axle 10, but by providing the rubber blocks or cushions 11 there will be a yielding connection as between the suspended running gear or frame and the rear axle 10.

For the purpose of preventing an undue upward movement of the running gear or frame 1 independent of the axle 10 the cross bolt 8 is provided and for the purpose of cushioning this upward movement or what might be termed throw the cushioned blocks 9 are provided. From the front or forward axle 14 is suspended the plate 15 by means of the clips 15ᵃ. To the plate 15 is attached the king-pin 17, which king-pin is connected to the plate 15 by screw threads or otherwise, which king-pin extends downward and through the forward tie-plate or bar 3 by which arrangement the forward axle 14 can be turned in either direction with reference to the running gear or frame. Below the tie-plate 3 and around the king-pin 17 is located the spring 18, which spring forms a support for the front or forward end of the running gear or frame. For the purpose of supporting the spring 18 the lower end of the king-pin 17 is provided with the head 19, which head may be attached in any convenient and well known manner. Between the plate 15 and the top of the tie-bar 3 is located the spring 20, by means of which the frame or running gear is properly cushioned in both directions.

It will be understood that the automobile frame or running gear is suspended at three points only and all of the points cushioned above and below by means of which the jar is removed, not only by the ordinary cushioned tires but as between the axles and the frame. It will be understood that by thus cushioning the frame when the same is attached to an ordinary horse drawn vehicle having the ordinary iron or steel tires, the frame upon which the motor mechanism is connected, will be cushioned in such a manner that the injurious jarring will be removed.

In Fig. 1 of the accompanying drawing I have conventionally illustrated a motor and the necessary intermediate gearing consisting of the sprocket wheel 21, the drive chain 22, the sprocket wheel 23, the shaft 24, the sprocket wheel 25 the drive chain 26 and the sprocket wheel 27, which sprocket wheel 27 is attached to the rear traveling wheel 28. It will be understood that the sprocket wheel 25, the drive chain 26 and the sprocket wheel 27 are to be duplicated so that power will be conveyed to each of the rear traveling wheels. By suspending the running gear or frame below the axle the motor is located some distance below the vehicle body and in such a position that it is of easy access and at the same time is not inclosed but is left exposed so that when a gasolene motor is employed the air is free to pass over the same and assist in cooling it.

Having fully described my invention what I claim as new and desire to secure by Letters Patent, is—

1. In an automobile of the class described, the combination of a frame, one end of said frame provided with fixed upright members, a rear vehicle axle located between the uprights, cushion blocks located upon said rear axle, clips located over and upon the cushion blocks, tie bolts located above the cushion blocks and the clips, said tie bolts secured to the uprights, all arranged substantially as and for the purpose specified.

2. In an automobile of the class described, the combination of a frame, one end of said frame provided with uprights, a rear vehicle axle located between said uprights, cushion blocks located upon the axle, clips located over and upon the cushion blocks, tie bolts located above the cushion blocks and the clips, a tie bar secured to the forward end of the frame, a king pin located through said tie bar and adapted to reciprocate through the aperture in the tie bar, springs located around the king pin above and below the tie bar, and a forward axle having suspended therefrom a plate and said plate secured to the king pin, substantially as and for the purpose specified.

In testimony that I claim the above, I have hereunto subscribed my name in the presence of two witnesses.

ULIDES S. SNYDER.

Witnesses:
JOHN H. SPONSELLER,
F. W. BOND.